United States Patent [19]
Jones

[11] 3,864,989
[45] Feb. 11, 1975

[54] FRONT SUSPENSION ASSEMBLIES FOR MOTOR VEHICLES

[75] Inventor: Clive Jones, Coventry, England

[73] Assignee: Chrysler United Kingdom Limited, London, England

[22] Filed: Sept. 4, 1973

[21] Appl. No.: 394,273

[30] Foreign Application Priority Data
Oct. 2, 1972 Great Britain..................... 45298/72
Mar. 28, 1973 Great Britain..................... 14891/73

[52] U.S. Cl.................... 74/498, 280/96, 280/124 B
[51] Int. Cl.............................................. B62d 1/20
[58] Field of Search ........................... 74/496–499; 280/124 B, 96

[56] References Cited
UNITED STATES PATENTS

| | | | |
|---|---|---|---|
| 904,146 | 11/1908 | Pare | 280/96 |
| 1,101,542 | 6/1914 | Hawthorne | 280/96 |
| 2,561,548 | 7/1951 | Wharam et al. | 280/124 B |
| 2,600,885 | 6/1952 | Kopfli | 280/96 |

*Primary Examiner*—Wesley S. Ratliff, Jr.
*Attorney, Agent, or Firm*—Edward F. Connors

[57] ABSTRACT

The specification discloses a front suspension assembly for a motor vehicle in which a rack and pinion housing extends across the front end of the vehicle, the housing has brackets secured adjacent the ends thereof which are mounted on the vehicle structure and wheel guidance arms for the front wheels are pivotally mounted on the brackets.

6 Claims, 2 Drawing Figures

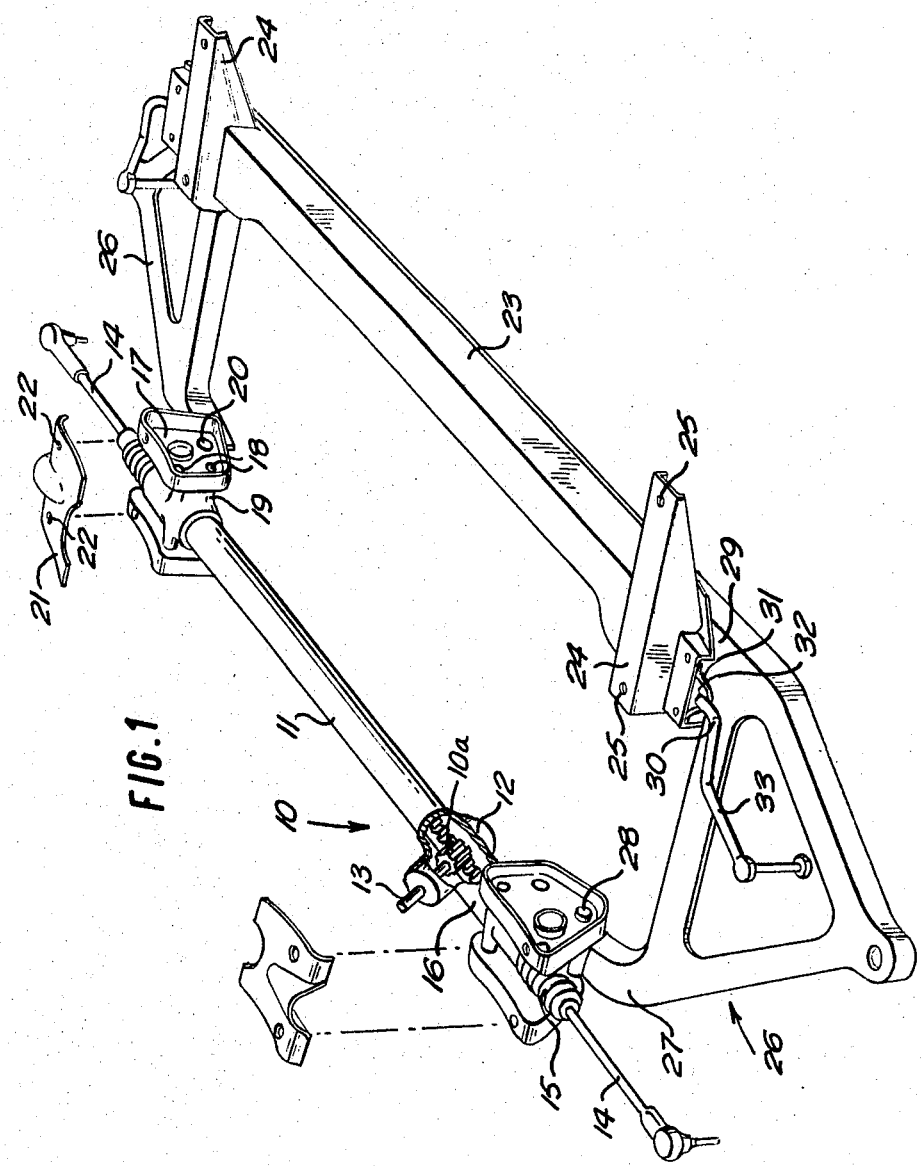

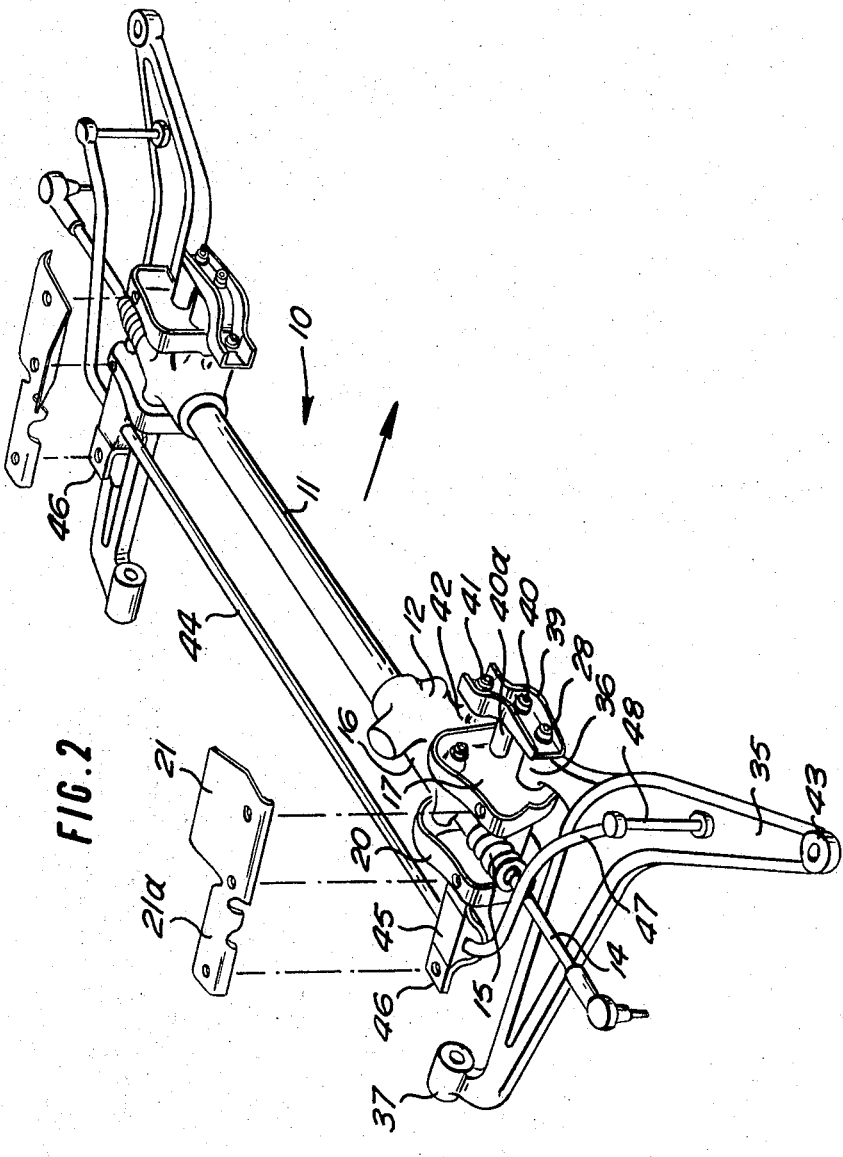

3,864,989

FRONT SUSPENSION ASSEMBLIES FOR MOTOR VEHICLES

BACKGROUND OF THE INVENTION

1. Field of the Invention

This invention relates to front suspension assemblies for motor vehicles.

2. Description of the Prior Art

A known form of front suspension assembly for a motor vehicle has a rigid cross-member extending across the vehicle and secured adjacent the ends thereof to the vehicle structure with wheel guidance arms pivotally mounted on the ends of the cross-member. A rack and pinion mechanism is located on the rearward side of the cross-member through which steering of the wheel is effected.

It is usually desirable to mount the engine of the vehicle as far forward as possible to minimise the intrusion of the engine into the passenger compartment but, where a front suspension of the above type is used, the forward position of the engine is determined by the position of the rack housing and this may necessitate adopting a more rearward position for the engine than would otherwise be desirable.

SUMMARY OF THE INVENTION

The invention provides a front suspension assembly for a motor vehicle, which assembly includes a rack and pinion steering mechanism having a rigid elongate housing in which the rack is mounted and two wheel guidance arms pivotally mounted on said housing adjacent the ends of the housing.

With this arrangement the rack housing can be located further forward than in the previous arrangement and also replaces the cross-member in carrying the wheel guidance arms.

BRIEF DESCRIPTION OF THE DRAWINGS

FIG. 1 is a perspective view of part of one front suspension assembly for a motor vehicle, and;

FIG. 2 is a perspective view of part of a second front suspension assembly.

DESCRIPTION OF THE PREFERRED EMBODIMENTS

Referring firstly to FIG. 1 the front suspension assembly shown includes a rack and pinion mechanism indicated generally at 10 which comprises a rigid hollow elongate rack housing 11 in which the rack is slidably mounted. Towards one end of the rack housing 11 there is a steering box 12 containing a pinion which meshes with the rack and having a steering shaft 13.

The ends of the rack protrude from the ends of the housing 11 and are connected by swivel joints to link arms 14. Flexible bellows 15 secured to the ends of the housing 11 extend part way along the link arms 14 and enclose the swivel joints.

Each end of the rack housing has a forging 16 to which two brackets 17 are secured on either side of the forging by bolts 18 extending through bosses 19 on the forging. Each bracket 17 has a laterally extending peripheral flange 20 and the two brackets at each end of the housing are bridged by a coverplate 21 welded to the flanges.

Flanges 20 and coverplates 21 are bored at 22 to receive bolts for securing the brackets to the vehicle structure whereby the rack housing is rigidly secured to the structure and assists in stiffening the structure.

Extending parallel to the rack housing 11 and located forwardly thereof there is an inverted channel section member 23 having longitudinally extending connector elements 24 welded adjacent either end thereof and bored at 25 to receive bolts for securing the elements to the vehicle structure.

The assembly further includes two wishbones 26 to assist in guiding the vertical movement of the vehicle wheels. Each wishbone 26 has a rearward limb 27 pivotally mounted on a pin 28 extending between one pair of the brackets 17 and a forward limb 29 pivotally mounted on a pin (not shown) secured to one end of the channel 23. In each case a resilient bush is provided between the pivot pin and the limb of the wishbone. The wishbones 26 may comprise the lower wishbones of double wishbone arrangements or may be used in conjunction with McPherson's struts for controlling wheel movement.

An anti-roll bar 30 extends through the channel 23 and is held in place by brackets 31 at the ends of the channel with insulating bushes 32 between the brackets and roll bar. The ends of the roll bar are cranked as indicated at 33 for connection to moving elements of the suspension.

It will be appreciated that the above assembly together with other elements of the suspension is built up prior to assembly on a vehicle and is then secured to the vehicle structure.

Referring now to FIG. 2 of the drawings, the front suspension assembly shown is generally similar to that described above and like parts have been allotted the same reference numerals. The assembly differs in that the wishbone-shaped wheel guidance arms are replaced by V-shaped arms 35 each of which has two integral bosses 36, 37 formed at the apex and at one end of the arm respectively which are axially aligned for pivotal mounting of the arm. The pivot pin 28 extending between each pair of brackets 17 is extended on the forward side of the forward bracket 17 and the hub 36 is rotatably mounted on the projecting pin. The end of the pin is supported in one end of a bracket 39 which is secured at its centre by a bolt 40 through the bracket 17 to the casting 16 with a spacer tube 40a between the bracket 39 and the bracket 17 and is secured at its other end by a bolt 41 screwed into a boss 42 formed on the casting 16.

The other hub 37 on the arm 35 is arranged to be pivotally mounted on the vehicle chassis adjacent the toe board of the vehicle. The arm 35 sweeps forwardly and outwardly of the rack housing and the end of the arm is formed with a mounting boss 43 to which a wheel carrier is attached.

An anti-roll bar 44 is located at the rear of the rack housing 11 and is supported in rubber blocks 45 attached by clamping plates 46 to the underside of the vehicle chassis frame. One of the bolts used to secure the flange 20 of the rearward bracket 17 of each pair of brackets is also used to secure one end of the clamping plates 46 to the chassis frame. The cover plates 21 through which the flanges 20 are bolted to the chassis are extended as indicated at 21a to overlie the mountings for the anti-roll bar and are bolted with the clamping plates 46 to the chassis. The anti-roll bar is formed with forwardly extending arms 47 at both ends thereof which overlie the wheel guidance arms 35 and are connected thereto by link rods 48.

It will be appreciated that with this arrangement wheel guidance arm pivots and the anti-roll bar are located further to the rear of the vehicle than in the embodiment of FIG. 1 and this provides additional space for a front transverse engine.

I claim:

1. A front suspension assembly for a motor vehicle comprising:
    a. a rack and pinion steering mechanism having a rigid elongate housing having opposing ends and a rack mounted for sliding movement in the housing;
    b. rigid mountings secured at both ends of the housing for rigidly securing the housing across a vehicle frame or body;
    c. two wheel support arms each having a pair of axially aligned pivot mountings;
    d. means to mount one of the pivot mountings of each of the two wheel support arms on the two rigid mountings for the rack housing respectively; and,
    e. means to mount the other pivot mountings of the two wheel support arms on further parts of the vehicle frame or body.

2. An assembly as claimed in claim 1 wherein the rigid mountings comprise a pair of brackets at each end of the housing rigidly secured to the housing on either side thereof, each pair of brackets supporting a pivot pin and one of said pivot mountings of the two wheel support arms being pivotally mounted on the two pivot pins respectively.

3. An assembly as claimed in claim 1 wherein the rearward pivot mounting of each wheel support arm is pivotally mounted on said rack housing and the forward pivot mounting of each arm is pivotally mounted on a rigid cross member for mounting on the structure parallel to the rack housing on the forward side thereof.

4. An assembly as claimed in claim 3 wherein an anti-roll torsion bar is mounted on the cross member, the torsion bar having arms at either end thereof extending rearwardly, the ends of the arms being connected to said wheel support arms.

5. An assembly as claimed in claim 1 wherein each wheel support arm has forward and rearward axially aligned pivot mountings, the forward of which mountings is pivotally mounted on the rack housing and the rearward of which mountings is located on the rearward side of the rack housing for pivotal mounting on the vehicle structure.

6. An assembly as claimed in claim 5 wherein an anti-roll bar is provided, said bar extending parallel to and on the rearward side of the rack housing and having arms at either end thereof extending forwardly, the forward ends of the arms being connected to the wheel support arms and mounting means being provided for mounting the bar on the vehicle chassis.

* * * * *